(12) United States Patent
Schwarz et al.

(10) Patent No.: US 10,823,085 B2
(45) Date of Patent: Nov. 3, 2020

(54) HIGH TEMPERATURE DISK CONDITIONING SYSTEM

(71) Applicant: United Technologies Corporation, Farmington, CT (US)

(72) Inventors: Frederick M. Schwarz, Glastonbury, CT (US); Matthew P. Forcier, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 346 days.

(21) Appl. No.: 15/979,906

(22) Filed: May 15, 2018

(65) Prior Publication Data

US 2018/0258862 A1    Sep. 13, 2018

Related U.S. Application Data

(62) Division of application No. 14/754,325, filed on Jun. 29, 2015, now Pat. No. 9,995,222.

(60) Provisional application No. 62/029,237, filed on Jul. 25, 2014.

(51) Int. Cl.
| | |
|---|---|
| *F02C 9/18* | (2006.01) |
| *F01D 25/10* | (2006.01) |
| *F01D 5/08* | (2006.01) |
| *F01D 11/24* | (2006.01) |
| *F01D 9/06* | (2006.01) |
| *F02C 3/34* | (2006.01) |
| *F02C 7/12* | (2006.01) |

(52) U.S. Cl.
CPC .................. *F02C 9/18* (2013.01); *F01D 5/08* (2013.01); *F01D 5/082* (2013.01); *F01D 9/065* (2013.01); *F01D 11/24* (2013.01); *F01D 25/10* (2013.01); *F02C 3/34* (2013.01); *F02C 7/125* (2013.01); *F05D 2260/20* (2013.01); *F05D 2260/941* (2013.01); *Y02T 50/60* (2013.01)

(58) Field of Classification Search
CPC . F01D 5/082; F01D 5/08; F01D 11/24; F01D 25/10; F05D 9/065; F02C 7/18; F02C 9/18; F02C 3/34
See application file for complete search history.

(56) References Cited

U.S. PATENT DOCUMENTS

| | | | |
|---|---|---|---|
| 4,117,669 A | 10/1978 | Heller | |
| 4,271,664 A * | 6/1981 | Earnest | ................... F01K 23/10 |
| | | | 60/39.181 |
| 4,645,416 A | 2/1987 | Weiner | |
| 4,741,153 A * | 5/1988 | Hallinger | ................ F01D 5/082 |
| | | | 415/116 |

(Continued)

OTHER PUBLICATIONS

Embraer, Airplane Operations Manual, Mar. 25, 2008, Embraer, vol. 1, p. 4-03-02 (Year: 2008).*

(Continued)

*Primary Examiner* — Gerald L Sung
*Assistant Examiner* — Kyle Robert Thomas
(74) *Attorney, Agent, or Firm* — Snell & Wilmer L.L.P.

(57) ABSTRACT

A gas-circulation system for conditioning a disk of an aircraft may comprise a first takeoff port configured to extract a combusted gas and a second takeoff port configured to extract an uncombusted gas. A first valve may comprise an inlet in fluid communication with the first and second takeoff ports and an outlet of the first valve in fluid communication with the disk.

10 Claims, 6 Drawing Sheets

(56) References Cited

U.S. PATENT DOCUMENTS

| | | | | |
|---|---|---|---|---|
| 5,353,685 | A | * | 10/1994 | Snow ................ G05B 19/4144 |
| | | | | 137/625.63 |
| 6,062,026 | A | * | 5/2000 | Woollenweber ........ F02B 37/04 |
| | | | | 60/605.2 |
| 6,615,574 | B1 | | 9/2003 | Marks |
| 7,240,691 | B2 | * | 7/2007 | Bevan .................. F01D 17/105 |
| | | | | 137/554 |
| 7,328,098 | B1 | * | 2/2008 | VanderLeest ............. F02C 9/18 |
| | | | | 60/785 |
| 8,484,975 | B2 | | 7/2013 | West |
| 10,113,495 | B2 | * | 10/2018 | Hiroe .................. F02D 41/0077 |
| 2008/0238698 | A1 | * | 10/2008 | Holt ........................ F01D 17/20 |
| | | | | 340/611 |
| 2014/0144124 | A1 | | 5/2014 | Mazumder |

OTHER PUBLICATIONS

USPTO; Restriction Requirement Office Action dated Sep. 19, 2017 in U.S. Appl. No. 14/754,325.
USPTO; Office Action dated Dec. 1, 2017 in U.S. Appl. No. 14/754,325.
USPTO; Notice of Allowance dated May 9, 2018 in U.S. Appl. No. 14/754,325.

* cited by examiner

HIGH TEMPERATURE DISK CONDITIONING SYSTEM

CROSS-REFERENCE TO RELATED APPLICATIONS

This application is a divisional of, and claims priority to, and the benefit of U.S. nonprovisional U.S. application Ser. No. 14/754,325, entitled "HIGH TEMPERATURE DISK CONDITIONING SYSTEM," filed Jun. 29, 2015. The '325 Application is a nonprovisional of, and claims priority to, and the benefit of U.S. Provisional Application No. 62/029,237, entitled "HIGH TEMPERATURE DISK CONDITIONING SYSTEM," filed on Jul. 25, 2014. The '325 and '237 Applications are hereby incorporated by reference in their entireties.

FIELD

The present disclosure relates to gas turbine engines, and, more specifically, to conditioning disks in a compressor or turbine of gas turbine engines.

BACKGROUND

As higher pressures are achieved in compressors of gas turbine engines, the temperature of compressed air leaving the compressors may increase as well. As a result, the temperature differential between the proximal and distal end of rotor disks in a compressor or turbine may cause thermal stress. Temperatures at the distal end of blades mounted to a rotor disk of a high-pressure compressor may reach 1,500° F. (815° C.) as the gas turbine engine accelerates. Meanwhile, the proximal portion of the rotor disk upon which the blade is mounted may only be at 400° F. (205° C.) during engine acceleration. The temperature gradient between the blade and proximal portion of the rotor disk may decrease the life of the rotor disks.

SUMMARY

A gas-circulation system for conditioning a disk in a gas turbine engine may comprise a first takeoff port configured to extract a combusted gas and a second takeoff port configured to extract an uncombusted gas. A first valve may comprise an inlet in fluid communication with the first and second takeoff ports and an outlet of the first valve in fluid communication with the disk.

In various embodiments, the gas-circulation system may further comprise a second valve fluidly coupled between the outlet of the first valve and the disk. A first thermocoupling may be thermally coupled to an outlet of the second valve. A second thermocoupling may be thermally coupled to the outlet of the second valve. The second valve may be configured to fail in a closed position.

In various embodiments, the gas-circulation system may further comprise a combustor with the first takeoff port in fluid communication with the combustor, a turbine in fluid communication with and configured to be driven by the combusted gas from the combustor, and a compressor in fluid communication with and configured to supply the uncombusted gas to the combustor. The second takeoff port may be in fluid communication with the compressor. The first takeoff port may extract the combusted gas forward of the turbine. The first takeoff port may extract the combusted gas from a location between a high-pressure turbine and a low-pressure turbine. The first takeoff port may extract the combusted gas from a high-pressure turbine. A second valve may comprise an inlet in fluid communication with the first and second takeoff ports, and an outlet of the second valve may be in fluid communication with the disk in the compressor.

In various embodiments, a gas-circulation system for conditioning a compressor disk of an aircraft may comprise a non-transitory memory communicating with a controller, the non-transitory memory having instructions stored thereon that, in response to execution by the controller, cause the processor to perform operations. The operations are carried out by a controller and may comprise commanding an actuator to open and close a valve that outputs a mixed gas. The mixed gas may comprise at least one of an uncombusted gas and a combusted gas. The operations may further comprise determining an engine speed, comparing the engine speed to closing criteria, and concluding that a failure occurred in the valve if a state of the valve is open in response to the engine speed being within the closing criteria.

In various embodiments, a non-transitory computer readable storage medium may bear instructions for conditioning a compressor, the instructions, when executed by a processor, cause said processor to perform operations comprising commanding an actuator to open and close a valve that outputs a mixed gas. The mixed gas may comprise at least one of an uncombusted gas and a combusted gas. The operations may further comprise determining an engine speed, comparing the engine speed to closing criteria, and concluding that a failure occurred in the valve if a state of the valve is open in response to the engine speed being within the closing criteria.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
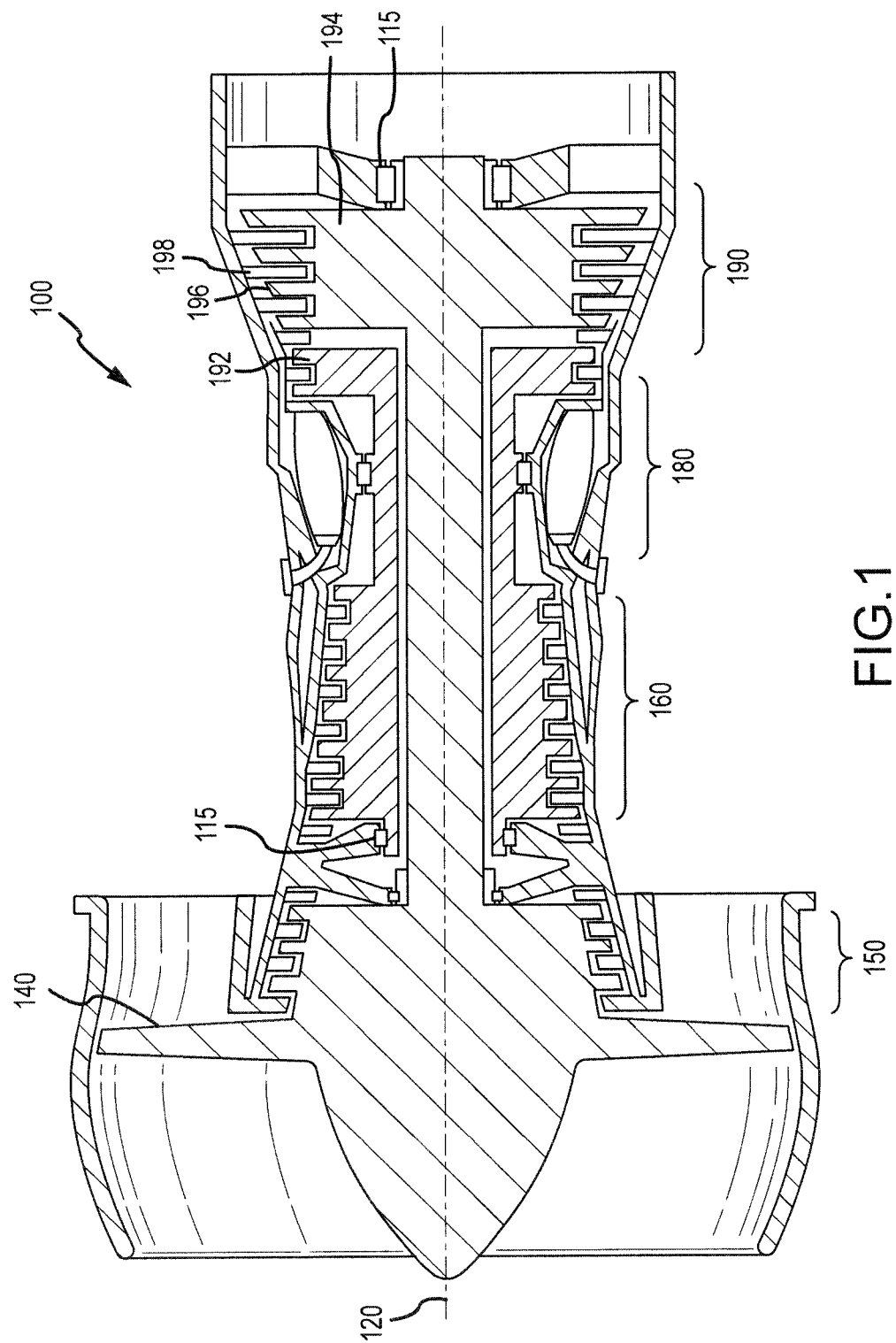
FIG. 1 illustrates cross-sectional view of an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in the compressor sections 150, 160 may be mixed with fuel and burned in combustion section 180 and expanded across turbine section 190. Turbine section 190 may include high-pressure rotors 192 and low-pressure rotors 194, which rotate in response to the expansion. Turbine section 190 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
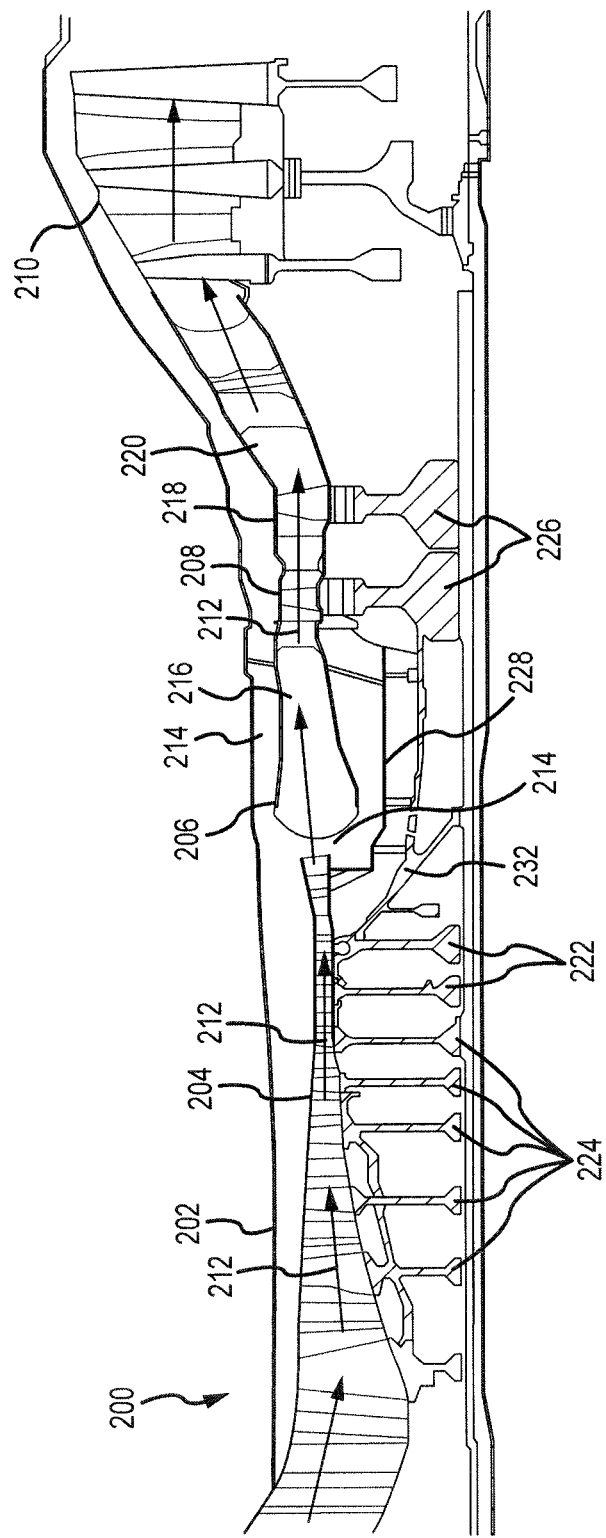
FIG. 2 illustrates the primary-flow gas path in a gas turbine engine through the high-pressure compressor, combustor, high-pressure turbine, and low-pressure turbine, in accordance with various embodiments.

FIG. 2 illustrates the primary flow gas path through gas turbine engine 200, in accordance with various embodiments. Gas turbine engine 200 may include case 202, high-pressure compressor 204, combustor 206, high-pressure turbine 208, and low-pressure turbine 210. Gas may flow into high-pressure compressor 204 along gas path 212. Gas flowing through high-pressure compressor 204 along gas path 212 may be compressed, resulting in an increase in pressure and temperature relative to the pressure and temperature upon entering high-pressure compressor 204. Uncombusted gas in gas path 212 leaving high-pressure compressor 204 may be referred to as T3 gas. T3 gas may have a varying temperature at different engine speeds. The temperature of T3 gas may be about 400° F. (205° C.) when gas turbine engine 200 is at idle speeds and may reach about 1,100° F. (593° C.) or higher as gas turbine engine 200 accelerates for takeoff, where the term "about" in this context only may refer to +/−200° F. Different engines may have higher temperatures or lower temperatures at each stage. T3 gas may be present at location 214 of gas turbine engine 200. T3 gas leaving the high-pressure compressor may then flow into combustor 206 to supply combustor 206 with air for combustion.

In various embodiments, uncombusted T3 gas may be mixed with fuel and burned in combustor 206. Combusted gas in combustor 206 may be referred to as T4 gas. T4 gas may leave combustor 206 and enter high-pressure turbine 208. T4 gas may reach or exceed temperatures of up to 3,500° F. (1,925° C.) or higher. T4 gas may be located at location 216, for example. T4 gas leaving combustor may follow gas path 212 to drive high-pressure turbine 208.

In various embodiments, combusted gas that has entered, but not exited, high-pressure turbine 208 may be identified as T4.25 gas. T4.25 gas may be significantly cooler than T4 gas exiting combustor 206. For example, T4.25 gas may be at temperatures of about 1,000° F.-2,000° F. (537° C.-1,093° C.), where the term "about" in this context only may refer to +/−500° F. T4.25 gas may be located at location 218, for example. The T4.25 gas then follows out high-pressure turbine 208 and into low-pressure turbine 210 along gas path 212.

In various embodiments, combusted gas exiting high-pressure turbine 208 and entering low-pressure turbine 210 may be referred to as T4.5 gas. T4.5 gas may be cooler than T4.25 gas found in the high-pressure compressor or T4 gas exiting the combustor. For example, T4.5 gas may be about 1,500° F. (815° C.) degrees at idle, where the term "about" in this context only may refer to +/−500° F. T4.5 gas may be located at location 220 in gas path 212, for example. The T4.5 gas then follows gas path 212 into low-pressure turbine 210.

In various embodiments, high-pressure compressor 204 includes aft disks 222 and forward disks 224. Both aft disks 222 and forward disks 224 may rotate to compress gas in gas path 212. Aft disks 222 and forward disks 224 may include blades at a distal end of the disks and a bore through the proximal portion of the disk. As engine speed is increased such as during a run-up from ground idle to takeoff power, the temperatures at the distal portions of aft disks 222 and forward disks 224 may increase more quickly than the temperature of the more proximal portion of aft disks 222 and forward disks 224, causing a large temperature gradient along aft disks 222 and forward disks 224 that runs from higher temperature at the distal ends to lower temperature at the proximal portions of the aft disks 222 and forward disks 224. The temperature gradient may be larger in aft disks 222 than the temperature gradient in forward disks 224 owing to the much higher temperature excursion there.

In various embodiments, high-pressure turbine 208 includes disks 226. As engine speeds increase, temperatures at the distal ends of disks 226 adjacent to blades increase more quickly than temperatures at the proximal portion of disks 226 adjacent to the bore. A temperature gradient may increase between the distal ends and proximal portions of disks 226 as gas turbine engine 200 accelerates for takeoff. Shaft 232 mechanically couples aft disks 222 of high-pressure compressor 204 with disks 226 of high-pressure turbine 208.

Figure 3A:
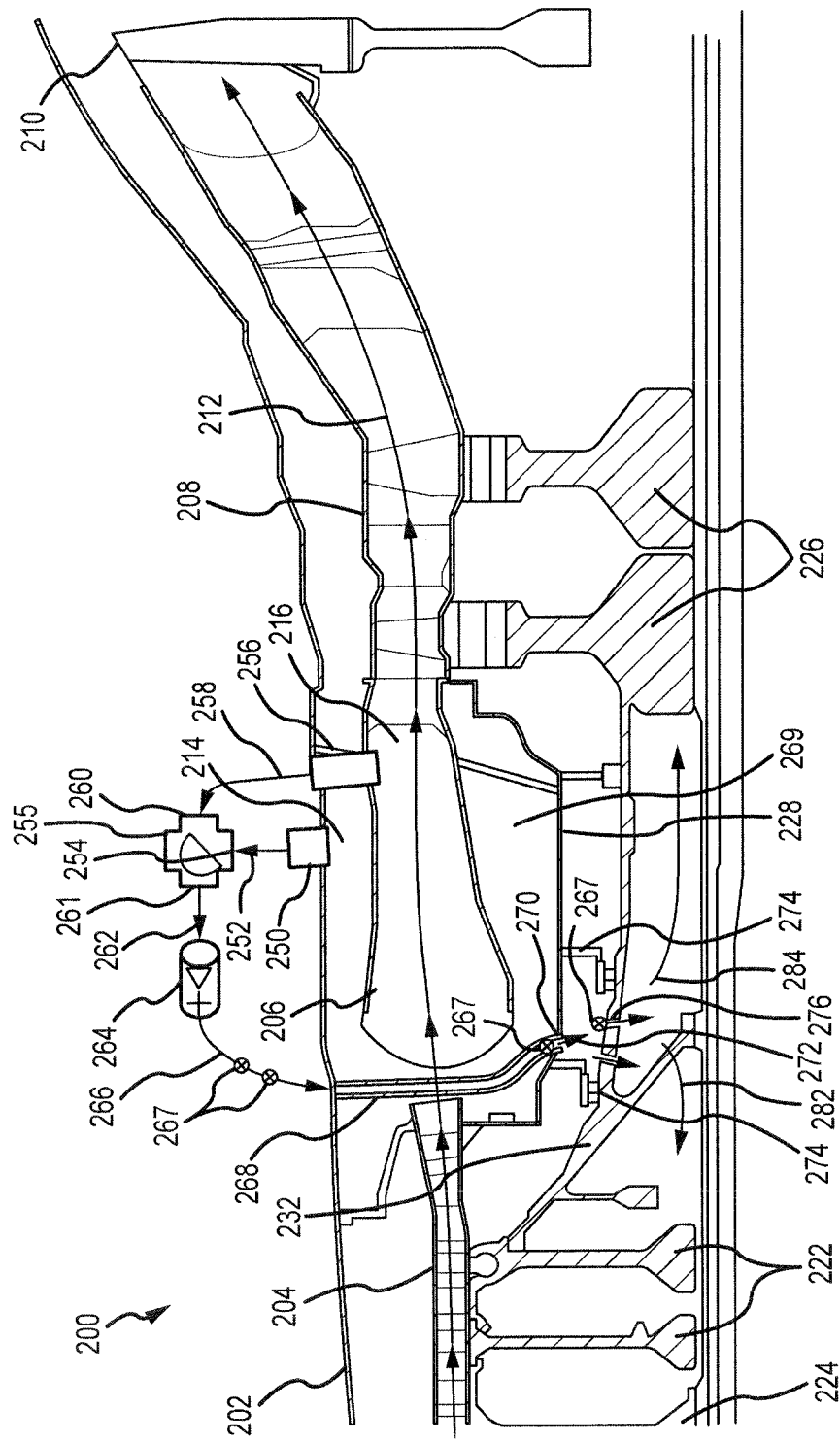
FIG. 3A illustrates a disk conditioning system for a gas turbine engine using combusted gas extracted from the gas path forward of the turbines, in accordance with various embodiments.

FIG. 3A illustrates a disk conditioning system for gas turbine engine 200, in accordance with various embodiments. The disk conditioning system primarily preheats disks in either the turbine or the compressor or both to reduce a thermal gradient within the disks during takeoff. Takeoff port 250 penetrates case 202 to reach the T3 gas leaving high-pressure compressor 204 prior to entering combustor 206. Takeoff port 250 extracts uncombusted T3 gas. Takeoff ports 256 and 250 are shown at separate locations but these might be made concentric such that the cooler takeoff port 250 could immediately quench the extremely high temperatures in takeoff port 256 and thereby also reduce the temperatures of conduit 258. Takeoff port 250 may be made of a high performance nickel-chromium alloy such as an austenitic nickel-chromium-based superalloy (e.g., INCONEL), metals, natural or synthetic polymeric materials (e.g., natural rubber and polytetrafluoroethylene), or other materials suitable to withstand T3 gas temperatures that may exceed 1,100° F. (593° C.) degrees when gas turbine engine 200 is operating at takeoff speeds. The gas extracted by takeoff port 250 may flow through conduit 252 into inlet 254 of valve 255. Conduit 252 may be may be pipe or tubing made from metal, natural or synthetic polymeric materials (e.g., natural rubber and polytetrafluoroethylene), ceramic or any material suitable to withstand T3 gas temperatures. Conduit 252 may be insulated to prevent heat exchange while the T3 gas is in conduit 252.

In various embodiments, takeoff port 256 may penetrate a liner of combustor 206 to reach T4 gas. Takeoff port 256 is configured to extract gas from combustor 206 and transport the T4 gas through conduit 258 into inlet 260 of valve 255. Takeoff port 256 may include openings through the sidewalls to quickly quench the T4 gas as it is extracted from combustor 206 to manage the temperature of the combusted gas. Takeoff port 256 may be made of a high performance nickel-chromium alloy such as an austenitic nickel-chromium-based superalloy (e.g., INCONEL), metals, ceramics or other materials suitable to withstand T4 gas temperatures that may reach 3,500° F. (1,925° C.) degrees or higher when gas turbine engine 200 is operating at high speeds. Gas temperatures and thermal profiles in the combustor can be dramatically moderated by leaking cooler air into the combustor surrounding takeoff port 256 to control T4 temperatures. Conduit 258 may be pipe or tubing made from metals including a single crystal alloy, ceramic, or any material suitable to withstand or any material suitable to withstand T4 gas temperatures. Conduit 258 may be insulated to prevent heat loss during transmission.

In various embodiments, valve 255 may be a combination mixing valve and shut-off valve. Inlet 254 of valve 255 may receive uncombusted T3 gas from takeoff port 250, and inlet 260 of valve 255 may receive combusted T4 gas from takeoff port 256. Valve 255 mixes the uncombusted T3 gas with the combusted T4 gas to produce a gas mixture with a desired temperature. For example, the gas mixture may have a predetermined desired temperature from about 800° F.-1, 200° F. (426° C.-650° C.), where the term "about" in this context only may refer to +/−200° F. Other temperatures may be possible as the gas mixture may be mixed to achieve any temperature in the range between the T3 gas temperature and the T4 gas temperature. For example, valve 255 may output a mixture comprising 100% T4 gas at idle to provide a mixture at the T4 gas temperature. Similarly, valve 255 may output a mixture comprising 100% T3 at takeoff maxium power gas to provide a mixture at the T3 gas temperature. Valve 255 may also output any intermediate mixture of T3 and T4 gas such as 33% T3 gas and 67% T4 gas to provide an intermediate temperature gas.

In various embodiments, valve 255 may comprise a remote actuator located in a relatively cool part of the nacelle to open and close valve 255. The remote actuator may adjust the amount of T4 gas and T3 gas in the mixture leaving valve 255 through outlet 261. Thus, valve 255 may be used to control the temperature of the mixed gas. Valve 255 may also operate as a shutoff valve by preventing gases from flowing out through inlet 254 or inlet 260. Valve 255 may also close outlet 261 and prevent any gas from flowing from outlet 261 as desired. For example, when gas turbine engine 200 is operating at ground idle speeds before takeoff, valve 255 may be opened to provide the mixture of combusted and uncombusted gases. At ground idle, the high-pressure turbine may be rotating at 50% to 70% of the maximum RPM for the high-pressure turbine. When gas turbine engine 200 is operating at speeds above ground idle during takeoff, or when the aircraft is in flight, valve 255 may be completely closed to prevent gas from flowing through outlet 261.

In various embodiments, gas flows out outlet 261 and through conduit 262 into valve 264. Valve 264 may be a redundant shutoff supplementing valve 255 and also allow flow from the outlet of valve 264 to be completely closed as desired. Valve 264 provides a redundant flow control with valve 255 to stop the flow of mixed gas through the heating system in the event of a failure in valve 255. For example, valve 255 may fail in a hot condition allowing a high temperature mixed gas to pass through outlet 261 and into valve 264. Valve 264 may be remotely closed to prevent the high-temperature mixed gas from flowing through valve 264 into conduit 266.

In various embodiments, valves 255 and 264 may be cycled every flight to test for correct valve operation. Correct valve operation may be detected in part using temperature readings from redundant thermocouplings 267, which may be thermally coupled to valve 255, by determining if the air temperature is too high when valve 255 should be closed. If a valve 255 is detected as failing in the open or hot position, valve 264 may be closed to stop the gas flow, the engine speed may be reduced, and the valve may be repaired and checked before the next flight. If valve 255 is detected as failing in a closed or cold position, the system can be repaired and checked before the next flight.

In various embodiments, a second, redundant heating system including a second valve 255 and valve 264 may be installed in parallel with the first heating system. The functionality of each redundant system may be as described above. With a redundant heating system, if a valve 255 fails in the open or too hot position in one heating system the redundant heating system can counter the action of the failed system by providing cooler T3 gas or closing and providing no gas so that less heating is provided. The failed system may then be repaired and checked before the next flight. If one heating system fails in the closed or too cold position, then the redundant system can counter the action of the failed system by providing preheating to aft disks 222 and disks 226. The failed system may be replaced and checked at a future time.

In various embodiments, mixed gas flows through valve 264 when the valve is open, through conduit 266 and into insulated conduit 268. Thermocouplings 267 may be located at any point downstream from valve 264 to measure the gas temperature. The temperature measurements from thermocouplings 267 may be used to determine whether valve 255 or 264 is closed. The system may comprise two or more thermocouplings with each thermocoupling on a separate channel. Insulated conduit 268 is insulated to limit heat loss while mixed gas is transported through diffuser case 269. Diffuser case 269 may contain T3 gas that exits high-pressure compressor 204. Insulated conduit 268 may extend from case 202 through diffuser case 269 to opening 270 in diffuser case wall 228. Mixed gas 272 may exit insulated conduit 268 towards shaft 232 connecting high-pressure compressor 204 to high-pressure turbine 208. Labyrinth seals 274 may be disposed on either side of opening 270 to keep mixed gas 272 flowing towards aft disks 222 and disks 226. Mixed gas 272 may flow through openings 276 in shaft 232. Mixed gas 282 may flow forward into the bore of aft disks 222 to heat aft disks 222 of high-pressure compressor 204. Mixed gas 284 may flow aft into the bore of disks 226 to heat disks 226 of high-pressure turbine 208. Heating the central portion of aft disks 222 and disk 226 may reduce the thermal gradient in aft disks 222 and disk 226 while gas turbine engine 200 accelerates and gas path 212 increases in temperature. Thus, heating aft disks 222 and disk 226 may reduce wear caused by thermal stress in aft disks 222 and disk 226.

Figure 3B:
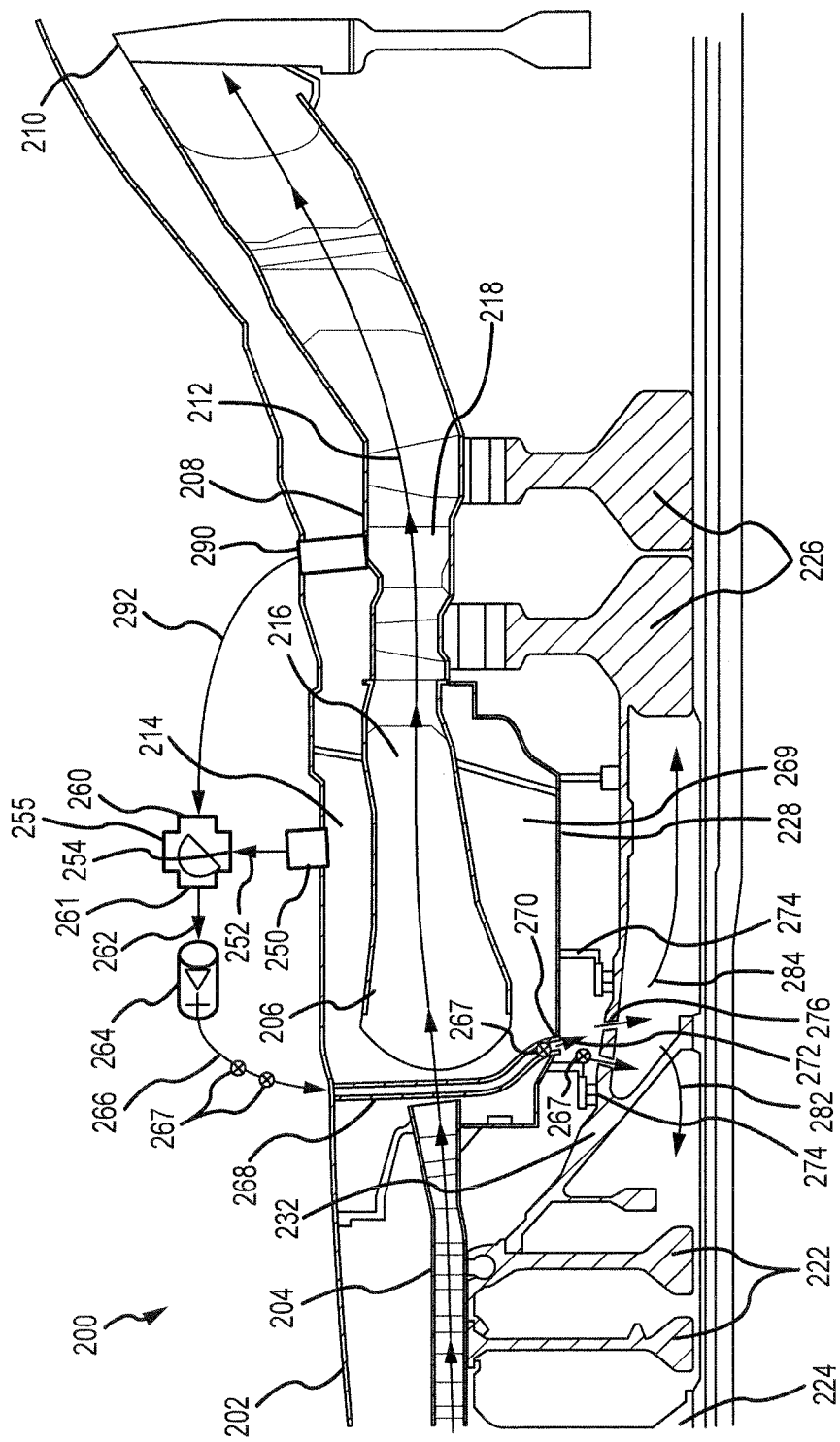
FIG. 3B illustrates a disk conditioning system for a gas turbine engine using combusted gas extracted from the gas path in the high-pressure compressor, in accordance with various embodiments.

FIG. 3B illustrates a disk preheating system for gas turbine engine 200, in accordance with various embodiments. Takeoff port 290 may penetrate high-pressure turbine 208 to reach combusted T4.25 gas. Takeoff port 290 is configured to extract gas from high-pressure turbine 208 and transport the gas through conduit 292 into inlet 260 of valve 255. Takeoff port 290 may be made of a high performance nickel-chromium alloy such as an austenitic nickel-chromium-based superalloy (e.g., INCONEL), metals, ceramics or other materials suitable to withstand T4.25 gas temperatures that may exceed 2,000° F. (1,095° C.) degrees when gas turbine engine 200 is operating at high speeds. Conduit 292 may be pipe or tubing made from metal, natural or synthetic polymeric materials (e.g., natural rubber and polytetrafluoroethylene), ceramic or any material suitable to withstand T4.25 gas temperatures. Conduit 292 may be insulated to prevent heat loss during transmission.

In various embodiments, inlet 254 of valve 255 may receive uncombusted T3 gas from takeoff port 250, and inlet 260 of valve 255 may receive combusted T4.25 gas from takeoff port 290. Valve 255 mixes the uncombusted T3 gas with the combusted T4.25 gas to produce a gas mixture with the desired temperature. For example, the gas mixture may have a predetermined desired temperature from about 800° F.-1,200° F. (420° C.-650° C.), where the term "about" in this context only may refer to +/−200° F. Other temperatures may be possible as the gas mixture may be mixed to achieve any temperature in the range between the T3 gas temperature and the T4.25 gas temperature. For example, valve 255 may output a mixture comprising 100% T4.25 gas to provide a mixture at the T4.25 gas temperature. Similarly, valve 255 may output a mixture comprising 100% T3 gas to provide a mixture at the T3 gas temperature. Valve 255 may also output any intermediate mixture of T3 and T4.25 gas such as 33% T3 gas and 67% T4.25 gas to provide an intermediate temperature gas.

In various embodiments, valve 255 may comprise a remote actuator located in a cool part of the nacelle to open and close valve 255. The remote actuator may adjust the amount of T4.25 gas and T3 gas in the mixture leaving valve 255 through outlet 261. Thus, valve 255 may be used to control the temperature of the mixed gas.

Figure 3C:
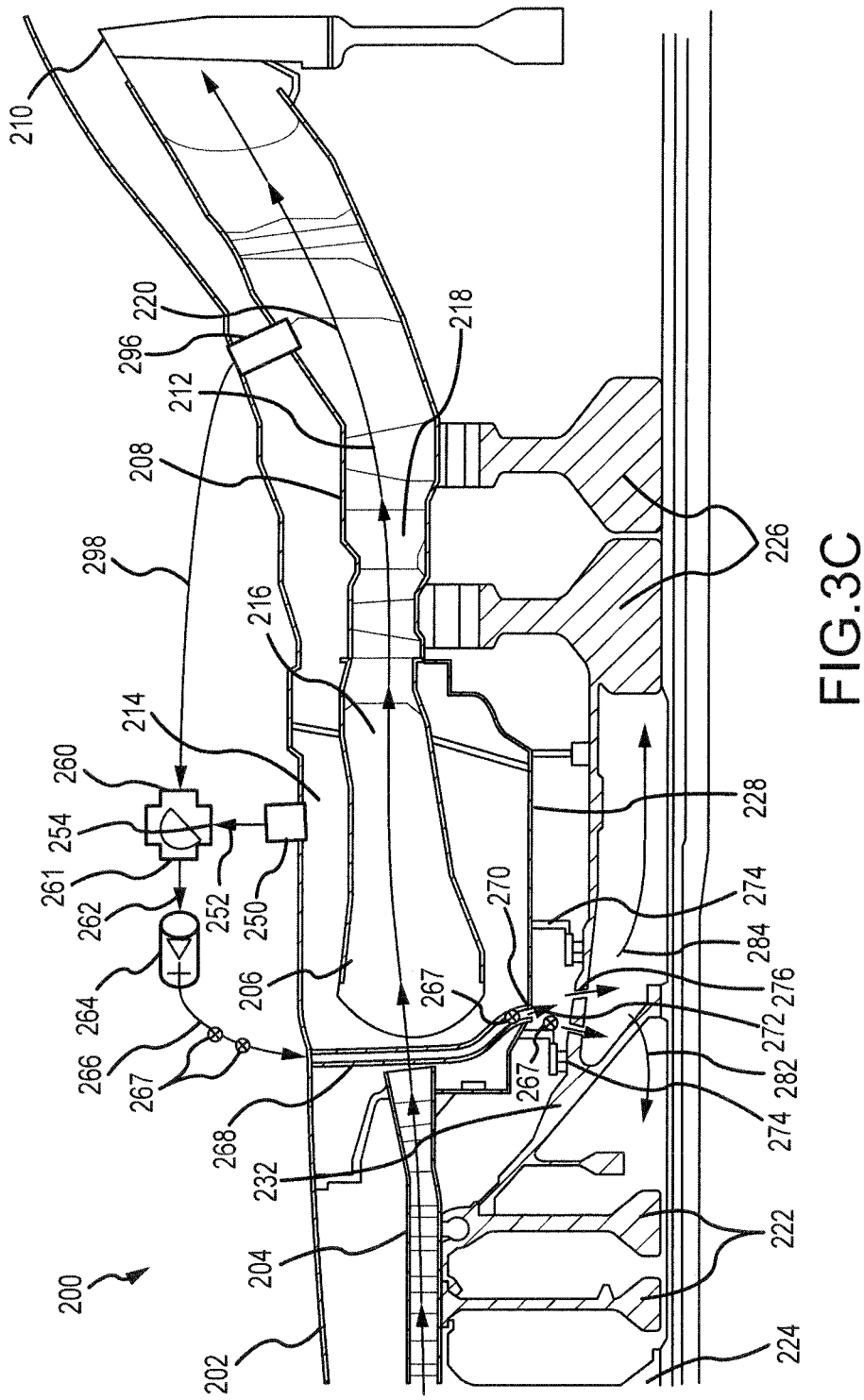
FIG. 3C illustrates a disk conditioning system for a gas turbine engine using combusted gas extracted from the gas path between the high-pressure compressor and low-pressure compressor, in accordance with various embodiments.

FIG. 3C illustrates a disk preheating system for gas turbine engine 200, in accordance with various embodiments. Takeoff port 296 may enter gas path 212 between high-pressure turbine 208 and low-pressure turbine 210 to reach T4.5 gas. Takeoff port 296 is configured to extract gas from gas path 212 and transport the gas through conduit 298 into inlet 260 of valve 255. Takeoff port 296 may be made of a high performance nickel-chromium alloy such as an austenitic nickel-chromium-based superalloy (e.g., INCONEL), metals, rubbers, ceramics or other materials suitable to withstand T4.5 gas temperatures that may exceed 1,500° F. (815° C.) degrees when gas turbine engine 200 is operating at high speeds. Conduit 298 may be pipe or tubing made from metal, natural or synthetic polymeric materials (e.g., natural rubber and polytetrafluoroethylene), plastic, ceramic or any material suitable to withstand T4.5 gas temperatures. Conduit 298 may be insulated to prevent heat loss during transmission.

In various embodiments, inlet 254 of valve 255 may receive uncombusted T3 gas from takeoff port 250, and inlet 260 of valve 255 may receive combusted T4.5 gas from takeoff port 296. Valve 255 mixes the uncombusted T3 gas with the combusted T4.5 gas to produce a gas mixture with the desired temperature. For example, the gas mixture may have a predetermined desired temperature from about 800° F.-1,200° F. (420° C.-650° C.), where the term "about" in this context only may refer to +/−200° F. Other temperatures may be possible as the gas mixture may be mixed to achieve any temperature in the range between the T3 gas temperature and the T4.5 gas temperature. For example, valve 255 may output a mixture comprising 100% T4.5 gas to provide a mixture at the T4.5 gas temperature. Similarly, valve 255 may output a mixture comprising 100% T3 gas to provide a mixture at the T3 gas temperature. Valve 255 may also output any intermediate mixture of T3 and T4.5 gas such as 33% T3 gas and 67% T4.5 gas to provide an intermediate temperature gas.

In various embodiments, valve 255 may comprise a remote actuator located in a cool part of the nacelle to open and close valve 255. The remote actuator may adjust the amount of T4.5 gas and T3 gas in the mixture leaving valve 255 through outlet 261. Thus, valve 255 may be used to control the temperature of the mixed gas.

Figure 4:
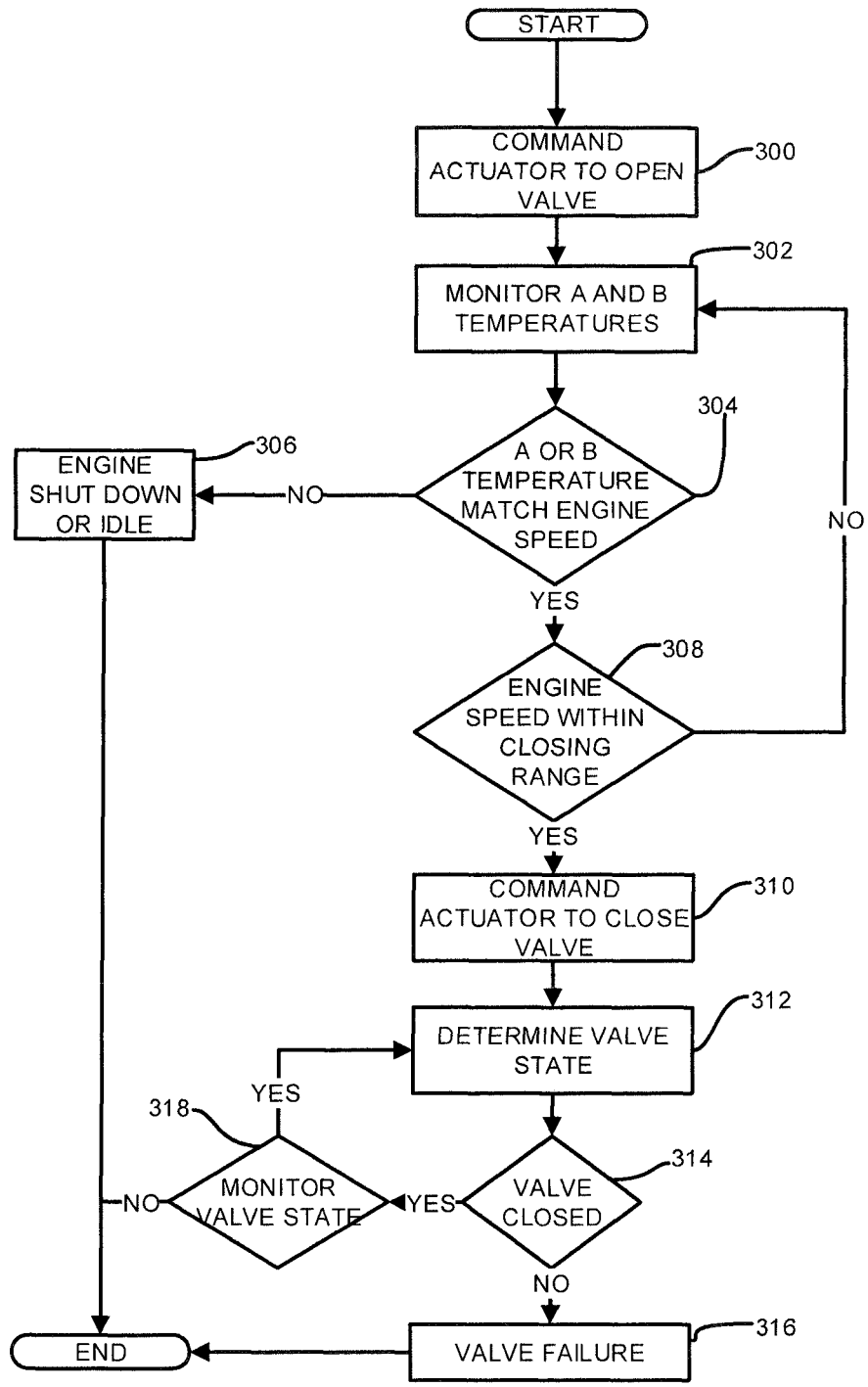
FIG. 4 illustrates a flow chart of an exemplary methodology for controlling a heating system, in accordance with various embodiments.

FIG. 4 illustrates a flow chart of the logical operations to implement an exemplary methodology for controlling operation of a disk heating system, in accordance with various embodiments. The flow chart of FIG. 4 may be thought of as depicting steps of a method carried out by the Full Authority Digital Engine Control (FADEC) or a separate controller. Although FIG. 4 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning with block 300, the system commands the actuator to open valve 255 in response to the aircraft being at idle on the ground prior to takeoff. For example, if gas turbine engine 200 is at ground idle prior to takeoff then valve 255 should be opened to heat aft disks 222 and/or disks 226. In response to gas turbine engine 200 is operating at a predetermined speed above ground idle, valve 255 should be closed to prevent overheating aft disks 222 or disks 226. If the aircraft is in a permitted state to open valve 255, then the control system may command the actuator to open valve 255 in block 300. If the operational state of the aircraft is not in a permitted state to open valve 255, then the control system may not open valve 255. The permitted states may include when the engine is operating at ground idle prior to takeoff. For example, if the aircraft has taken off but returned an engine to ground-idle speeds then the aircraft may not be in a permitted state for valve 255 to be opened.

In block 302, the system monitors A and B channel temperature readings from A and B channel thermocouplings 267, respectively. Thermocouplings 267 provide temperature readings and may be compared to one another or to engine speed to determine whether a thermocoupling has failed. In block 304, A and B temperatures may be compared to engine speed to determine whether a thermocoupling 267 has failed. For example, channel A has a thermocoupling 267 and channel B has a thermocoupling 267 where both take independent temperature measurements. If channel A and B temperatures substantially match each other, but neither temperature corresponds to engine speed, then the engine may be shut down or reduced to idle in block 306. If the channel A temperature reading corresponds with the engine speed, but the channel B temperature does not match the engine speed, then the system may leave valve 255 open until engine speeds accelerate above ground idle (i.e., the aircraft begins acceleration down the runway). If both A channel and B channel temperatures substantially match each other and also correspond to the engine speed, the system may leave valve 255 open until engine speeds accelerate above ground idle (i.e., the aircraft begins acceleration down the runway).

In block 308, the engine speed may be checked to determine whether the aircraft has begun acceleration down the runway. For example, the engine may be at ground idle speeds, takeoff speeds, or flight idle speeds with each range of engine speeds varying depending on the aircraft. The engine speed may be used to determine whether the engine is operating at a speed for which valve 255 should be closed. For example, valve 255 should be closed when the engine is operating within a predetermined closing range of operating speeds above ground idle (i.e., after takeoff) or when the temperatures measured by the A and B channel thermocouplings indicate that the temperature is too hot. Thus, if the current engine speed matches the closing range then the control system may command the valve actuator to close valve 255 in block 310. If the current engine speed does not match the closing range, then the control system may return to block 302 to continue monitoring the A and B temperatures.

After the control system has closed valve 255, the system may continue to monitor the state of valve 255 to ensure safe operation. In block 312, the control system determines whether valve 255 is opened, partially opened or closed. For example, thermocouplings 267 measure the temperature downstream from valve 255 and can be used to determine whether the air temperature tends to suggest that valve 255 is at least partially open or closed. If the valve state is at least partially open at block 314 then the open state may indicate a valve failure. In block 316 the valve failure is handled. Valve failure may be handled by a warning light or display, closing valve 264, reducing engine speed to idle, shutting down the engine, or taking no action depending on the desired response to a valve failure. If the valve state is closed at block 314 then valve 255 may be operating normally. The system may either continue to monitor valve 255 or terminate from block 318.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas-circulation system for conditioning a compressor disk of an aircraft, the gas-circulation system comprising:
   a non-transitory memory communicating with a controller, the non-transitory memory having instructions stored thereon that, in response to execution by the controller, cause a processor to perform operations comprising:
      commanding, by the controller, an actuator to open and close a valve that outputs a mixed gas with a desired temperature to heat a portion of the compressor disk proximate to a bore of the compressor disk, the valve comprising a mixing valve, wherein the mixed gas comprises an uncombusted gas and a combusted gas;
      determining, by the controller, an engine speed;
      comparing, by the controller, the engine speed to closing criteria; and
      concluding, by the controller, that a failure occurred in the valve if a state of the valve is open in response to the engine speed being within the closing criteria.

2. The gas-circulation system of claim 1, wherein the instructions further comprise:
   determining, by the controller, an operational state of the aircraft; and
   commanding, by the controller, the actuator to open the valve in response to the operational state corresponding to a predetermined operational state.

3. The gas-circulation system of claim 1, wherein the instructions further comprise commanding, by the controller, the actuator to close the valve in response to the engine speed matching the closing criteria.

4. The gas-circulation system of claim 1, wherein the instructions further comprise determining the state of the valve in response to a measurement from a thermocoupling.

5. The gas-circulation system of claim 1, wherein the instructions further comprise responding, by the controller, to the failure by closing a check valve.

6. The gas-circulation system of claim 1, wherein the closing criteria comprises a speed above a ground idle.

7. The gas-circulation system of claim 1, wherein the instructions further comprise responding to the failure by reducing the engine speed to a ground idle.

8. The gas-circulation system of claim 1, wherein the instructions further comprise monitoring the state of the valve.

9. The gas-circulation system of claim 1, wherein the instructions further comprise cycling the valve before a flight.

10. A non-transitory, computer readable storage medium bearing instructions for conditioning a compressor, the instructions, when executed by a processor, cause said processor to perform operations comprising:
   commanding an actuator to open and close a valve that outputs a mixed gas with a desired temperature to heat a portion of the compressor disk proximate to a bore of the compressor disk, the valve comprising a mixing valve, wherein the mixed gas comprises an uncombusted gas and a combusted gas;
   determining an engine speed;
   comparing the engine speed to closing criteria; and
   concluding that a failure occurred in the valve if a state of the valve is open in response to the engine speed being within the closing criteria.

* * * * *